April 6, 1965   C. H. WICKENBERG   3,177,342
COOKING DEVICE
Filed May 21, 1963

INVENTOR.
CHESTER H. WICKENBERG
BY George R. Clark
ATTORNEY

United States Patent Office 3,177,342
Patented Apr. 6, 1965

3,177,342
COOKING DEVICE
Chester H. Wickenberg, Elgin, Ill., assignor to Sunbeam Corporation, Chicago, Ill., a corporation of Illinois
Filed May 21, 1963, Ser. No. 282,040
9 Claims. (Cl. 219—392)

The present invention relates to cooking devices and, more particularly, to an electrically operated device for cooking relatively large items of food, such as hams, roasts, fowl, etc.

There are presently in use many so-called rotisserie-type cookers and ovens wherein the food which is cooked is supported on a rotary spit and rotated over or adjacent to a heat source. One disadvantage of these type cookers is that the spit extends within the food item causing injury thereto and making it difficult to cook items such as stuffed turkeys without loss of the stuffing as well as the internal juices that develop during cooking. The unbalance in the load often causes the spit to become loose from the food. In addition, food items must sometimes be tied with string and sewn or stitched in order that they will hold together in one piece on the spit during cooking and not fall apart or drop onto the heat source. Another disadvantage in rotisserie-type cookers which have the heat source below the food on the spit is that grease and other drippings from the food drop directly on such heat source causing undesirable smoke and often even flame which could cause burning of the food, and additionally cause deterioration of the heat source as well as cleaning difficulties with respect thereto.

Accordingly, it is an object of the present invention to provide a new and improved cooking device.

Another object of the present invention is the provision of a new and improved cooking device for cooking relatively large items of foods which eliminates many or all of the disadvantages of rotisserie-type cooking devices enumerated above.

It is a further object of the present invention to provide a new and improved cooking device for cooking relatively large items of food which does not require a spit to support the food and yet which still provides a substantially even heat over the area of the food being cooked.

Another object of the present invention is to provide a new and improved cooking device wherein the food to be cooked is fixedly supported and the heat source is moved relative to the surface of the food.

Still another object of the present invention resides in the provision of a new and improved device of the type described in the preceding paragraph wherein the heat source is never directly under the food, and, consequently, does not come in contact with drippings from such food.

A still further object of the present invention is the provision of a new and improved cooking device of the type described which is simple and reliable in construction and operation and provides a heat source which moves continually relative to the surface of the food being cooked.

Further objects and advantages of the present invention will become apparent as the following description proceeds, and the features of novelty which characterize the invention will be pointed out with particularity in the claims annexed to and forming a part of this specification.

Briefly, an embodiment of the present invention comprises a stationary support rack for fixedly supporting the food item which is to be cooked. A heating element is provided having legs which extend along opposite sides of the food item placed on the support rack. Means are provided for moving the heating element in an oscillatory manner about a longitudinal axis whereby the legs never pass completely under the food item but move between limiting positions adjacent the lower and upper side portions thereof. An enclosure having a removable top is provided to enclose the support rack, food item and heating element and to prevent the excessive loss of heat during cooking while retaining or collecting any escaping food juices.

For a better understanding of the present invention, reference may be had to the following detailed description when taken in conjunction with the drawing, in which.

Figure 2:
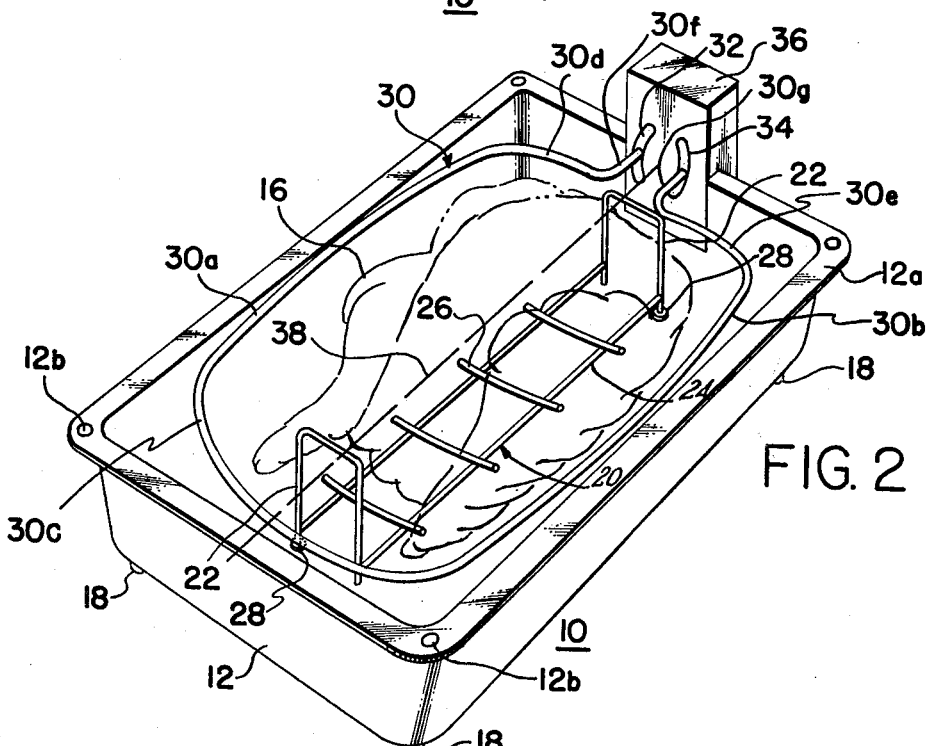
FIG. 2 is an enlarged perspective view of the cooking device of FIG. 1 from the opposite end of FIG. 1 and with the cover portion removed.
Figure 3:
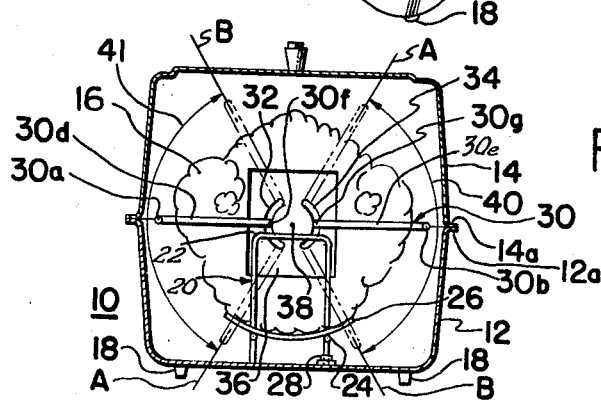
FIG. 3 is a sectional view taken substantially along line 3—3 of FIG. 1.

Referring now to the drawing, there is illustrated a cooking device 10 having a lower pan or vessel 12 and a removable cover 14 which together form an enclosure for cooking a relatively large item of food such as a turkey generally indicated at 16 in FIGS. 2 and 3. The pan 12 is provided with legs 18 preferably of heat insulating material in order to raise the bottom thereof above the surface on which the device is supported and, thus, to prevent damage to such surface because of heat. The upper edge of the pan 12 is provided with a peripheral flange 12a which is adapted to abut a mating peripheral flange 14a of the cover 14. Means, such as recesses 12b on the flange 12a of the pan 12 and mating bosses (not shown) on the lower surface of flange 14a of the cover 14, are provided in order accurately to align the cover 14 on the pan 12 and insure a relatively good seal between the flanges of the pan and cover to prevent excessive loss of heat or steam.

For the purpose of supporting the turkey 16 or other large food items which are to be cooked in the device 10, there is provided a support rack 20, which is preferably constructed of heat resistant metal rod, but which obviously may be made of any suitable material. The rack is provided with inverted U-shaped end members 22 which are joined with longitudinal members 24 and curved cross-supports 26 to form an integral supporting cradle for the turkey 16 or any other food item to be cooked. The support rack 20 is preferably assembled by spot welding these members together and at least two of the legs of the end members 22 are adapted to be inserted into bosses 28 provided on the bottom of the pan 12 to insure a predetermined orientation of the rack 20 relative to the pan 12. For cleaning the device the rack 20 can be easily removed from the pan 12 by lifting it upwardly out of engagement with the bosses 28. It should be noted that the food to be cooked, such as the turkey 16, is amply supported along its bottom surface and thus no spit is required which could damage the same. Furthermore, since no spit is required, there is no problem of the leakage of stuffing such as is commonly employed with a roast, turkey, or other fowl.

In order to provide the heat for cooking the food item, such as 16, there is provided an electric heating element 30, preferably of the line or sheathed type. This heating element is arranged in a loop so that one or more legs of the loop move in close proximity to the food to be cooked. As illustrated in the drawing, the heating element is arranged in a planar loop so as to encircle the item to be cooked but obviously it could be arranged in some other manner. The heating element 30 specifically illustrated is supported from one end of the pan 12. As illustrated, element 30 is provided with a pair of side legs 30a and 30b extending generally parallel along the sides of the food 16 which legs are joined by a curved end leg 30c. Opposite the end leg 30c there are provided a pair of supporting legs 30d and 30e which have parallel shanks 30f and 30g extending into curved elongated slots 32 and 34, respectively, in one wall of a housing 36 containing a suitable prime mover and mechanism for oscillating the heating element 30.

The housing 36 preferably contains electrically powered means for pivoting the heating element 30 about a horizontal axis, designated at 38 in FIGS. 2 and 3 of the drawing, which axis extends generally along the central longitudinal axis of the device 10. So that no portion of the heating element will pass directly beneath the food being cooked, such pivotal movement should be through an angle of less than three hundred and sixty degrees. Referring specifically to FIG. 3, the heating element 30 is illustrated as being oscillated about the axis 38 between a limiting position indicated by line A—A (FIG. 3) wherein the leg 30b of the heating element 30 is in its uppermost position and the leg 30a is in its lowermost position and a limiting position indicated by line B—B (FIG. 3) wherein the leg 30a is in its uppermost position and the leg 30b is in its lowermost position. The angular traverse of the legs 30a and 30b indicated by the arrows 41 and 40 (FIG. 3), respectively, is approximately one hundred twenty degrees; sixty degrees above and sixty degrees below a neutral horizontal plane determined by the flanges 12a and 14a.

From the foregoing, it is apparent that an arcuate surface of approximately sixty degrees both above and below the food item being cooked is not traversed by the moving legs of the heating element 30. These areas are amply heated by convection with the cooking device, conduction with the food item itself and direct radiation from the heating element, as well as by reflective heat from the top and sides of the cover 14 and from the bottom and sides of the pan 12.

It should be noted that in the limiting positions A—A and B—B, the legs 30a and 30b are not directly beneath the food 16 being cooked. This is desirable so that juices or grease which form on the surface of the food item and run down the sides to the bottom thereof do not drip on the heated legs 30a and 30b which could cause smoking and even flaming as well as deterioration of the heating element 30 and provide problems as far as cleaning is concerned. Most of the juices run down the sides of the turkey or other food item until they reach the longitudinal members 24 of the rack 20 where they collect and then drop to the bottom of the pan 12. Thus, the juices and fats collect in the pan and are not lost as in the usual rotisserie where the food on a spit is placed over a heat source and the juices are lost by dripping into the heat source.

One of the most advantageous features of the present invention is the fact that a large piece of food, such as a turkey or ham, can be cooked more rapidly because the heat source is substantially continually moving relative to the surface of the food and a higher temperature heat source can be utilized without danger of burning. As an example, a twenty pound turkey was cooked in the cooking device of the present invention having a 1500 watt heating unit in just three and one-half hours, while another twenty pound turkey required seven hours in a 2200 watt conventional oven. Because of the high temperature of the moving heating element and shortened cooking time, the turkey cooked in the device of the present invention was much more juicy and required no basting because the juices were sealed in and not lost around the area where the spit is inserted in a conventional rotisserie. Moreover, cooking in the new device is smokeless since the juices and fat do not drip on the heating element and the unit is much easier to clean than conventional rotisseries having a stationary heating element below the food being cooked.

Figure 1:
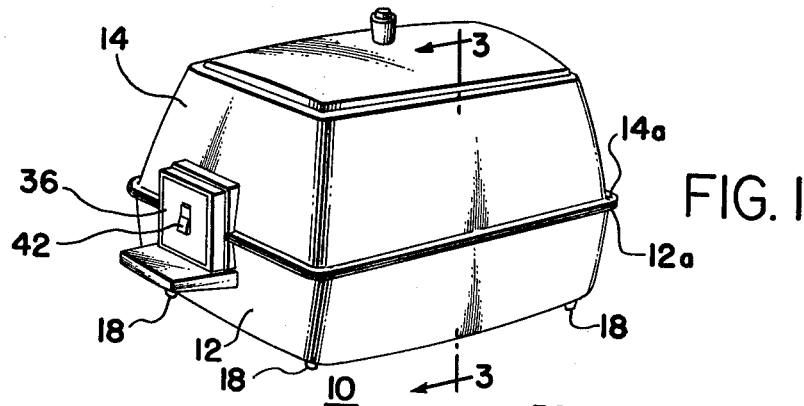
FIG. 1 is a somewhat end perspective view of a cooking device constructed in accordance with the features of the present invention.

The particular mechanism for moving or oscillating the heating element 30 of the present invention forms no part of the present invention. It should be compact so that the housing 36 may be small. If desired, an ON-OFF switch 42 (FIG. 1) may be incorporated in the housing 36 as well as suitable indicating lights (not shown) to indicate that the heating element 30 is energized.

While there has been illustrated and described but a single embodiment of the present invention, numerous changes and modifications are likely to occur to those skilled in the art, and it is aimed in the appended claims to cover all such changes and modifications as fall within the true spirit and scope of the present invention.

What is claimed as new desired to be secured by Letters Patent of the United States is:

1. A device for cooking food comprising support means for fixedly supporting said food, an electric heating element disposed to move adjacent the exterior of said food, and means for continuously oscillating said heating element about said food through an angle of more than ninety degrees and less than three hundred and sixty degrees, the oscillation of said heating element being such that no part of said heating element passes directly beneath said food.

2. A cooking device comprising a container, support means within said container for fixedly supporting said food, an electric heating element having a pair of legs extending along opposed sides of food disposed on said support means, and means for rotating said element about an axis extending generally along the longitudinal axis of food disposed on said support means, said rotation being through an angle greater than ninety degrees between a first position wherein one of said legs is adjacent said support means and the other remote therefrom and a second position wherein the other of said legs is adjacent said support means and said one leg is remote therefrom, said rotation being such that neither of said legs is ever disposed directly beneath food disposed on said support means.

3. The cooking device of claim 2 wherein said means for moving said element is supported from one end of said container.

4. The cooking device of claim 2 wherein said heating element oscillates about said axis through an angle of approximately one hundred and twenty degrees.

5. The cooking device of claim 3 wherein said means for moving said element includes a housing having a pair of elongated arcuate slots defined therein.

6. In a cooking device, a container defining a closed elongated cooking chamber having a removable cover, stationary means for supporting food in said chamber, an electric heating element in the form of a closed loop mounted for oscillating movement about an axis substantially coinciding with the longitudinal axis of said chamber and with the axis of food supported on said stationary means, and means for continuously oscillating said loop through an angle of between ninety and one hundred and eighty degrees to cause said loop to pass closely adjacent to the periphery of food supported on said stationary means, said oscillating movement being such that no part of said loop passes directly beneath said food whereby drippings from said food will not contact said heating element.

7. A cooking device comprising an elongated pan open at the top, means defining a horizontal flange around the periphery of said pan, a flanged cover for said pan, a housing supported on one end of said pan, an electric heating element in the form of a lightweight elongated planar loop of a size receivable within said pan, means for supporting said loop from one end for oscillation about a horizontal axis in the plane of said horizontal flange and along a line extending lengthwise of said pan at the center thereof, a rack in said pan for supporting food to be cooked, means for positioning said rack in a predetermined manner relative to said axis whereby food supported on said rack is surrounded by said loop, and means in said housing for oscillating said loop about said axis through an angle of less than one hundred and eighty degrees, but greater than ninety degrees so that no part of said loop passes under food on said rack to such an extent as to be engaged by drippings from said food.

8. The cooking device of claim 7 wherein said angle is approximately one hundred and twenty degrees and wherein the plane of said loop is never perpendicular to said plane of said horizontal flange.

9. A device for cooking food, first support means for supporting said food in a stationary position, an electric heating element, second support means for mounting said heating element to oscillate about an axis passing approximately through the center of food supported on said first support means, a portion of said element extending in a lengthwise direction of food on said first support means, said element including a radial connection between said portion and said second support means, and means oscillating said element and second support means through an angle less than three hundred and sixty degrees, but more than ninety degrees, whereby no portion of said element passes under said support means to a sufficient extent to be engaged by drippings from said food.

References Cited by the Examiner
UNITED STATES PATENTS

| | | | |
|---|---|---|---|
| 585,308 | 6/97 | Fraley | 99—390 |
| 1,140,338 | 5/15 | Serrell. | |
| 1,674,692 | 6/28 | McHugh et al. | 219—385 |
| 1,945,895 | 4/34 | Shenton | 99—390 X |
| 2,245,220 | 6/41 | Nelson. | |
| 2,387,516 | 10/45 | Kaminski | 219—352 |
| 2,722,172 | 11/55 | Garbo. | |

RICHARD M. WOOD, *Primary Examiner.*